United States Patent

Lord

[15] 3,646,331

[45] Feb. 29, 1972

[54] AUTOMATIC 100% LINE ADJUSTMENT OF SPECTROPHOTOMETERS

[72] Inventor: Joseph Samuel Lord, Walpole, Mass.

[73] Assignee: Kollmorgen Corporation, New York, N.Y.

[22] Filed: Sept. 3, 1970

[21] Appl. No.: 69,333

[52] U.S. Cl. .......................... 235/151.3, 235/196, 235/194, 356/96
[51] Int. Cl. .......................................... G06j 1/00, G01j 3/00
[58] Field of Search ............... 235/151.3, 196, 197, 194, 195, 235/150.52, 150.53; 250/41.9; 324/77; 356/96

[56] References Cited

UNITED STATES PATENTS

| | | | |
|---|---|---|---|
| 3,561,845 | 2/1971 | Boronkay et al. | 356/205 |
| 3,484,596 | 12/1969 | Vince | 235/151.3 X |
| 3,103,582 | 9/1963 | Morgan | 235/196 X |

*Primary Examiner*—Eugene G. Botz
*Assistant Examiner*—Edward J. Wise
*Attorney*—Pennie, Edmonds, Morton, Taylor and Adams

[57] ABSTRACT

A method and apparatus for correcting radiation measuring errors in a spectrophotometer by digitizing the output of a 100-percent line input at selected discrete wavelengths. Each of the digitized values represent the spectrophotometer response at a particular wavelength. A factor, called an M factor is computed from the output at each discrete wavelength such that the digitized output multiplied by the M factor will give a corrected 100-percent output at each wavelength. These factors are each stored, and then when a sample is measured by the spectrophotometer, each of the stored M factors are synchronously applied to multiply the input signal derived from the sample thereby generating a corrected output.

12 Claims, 1 Drawing Figure

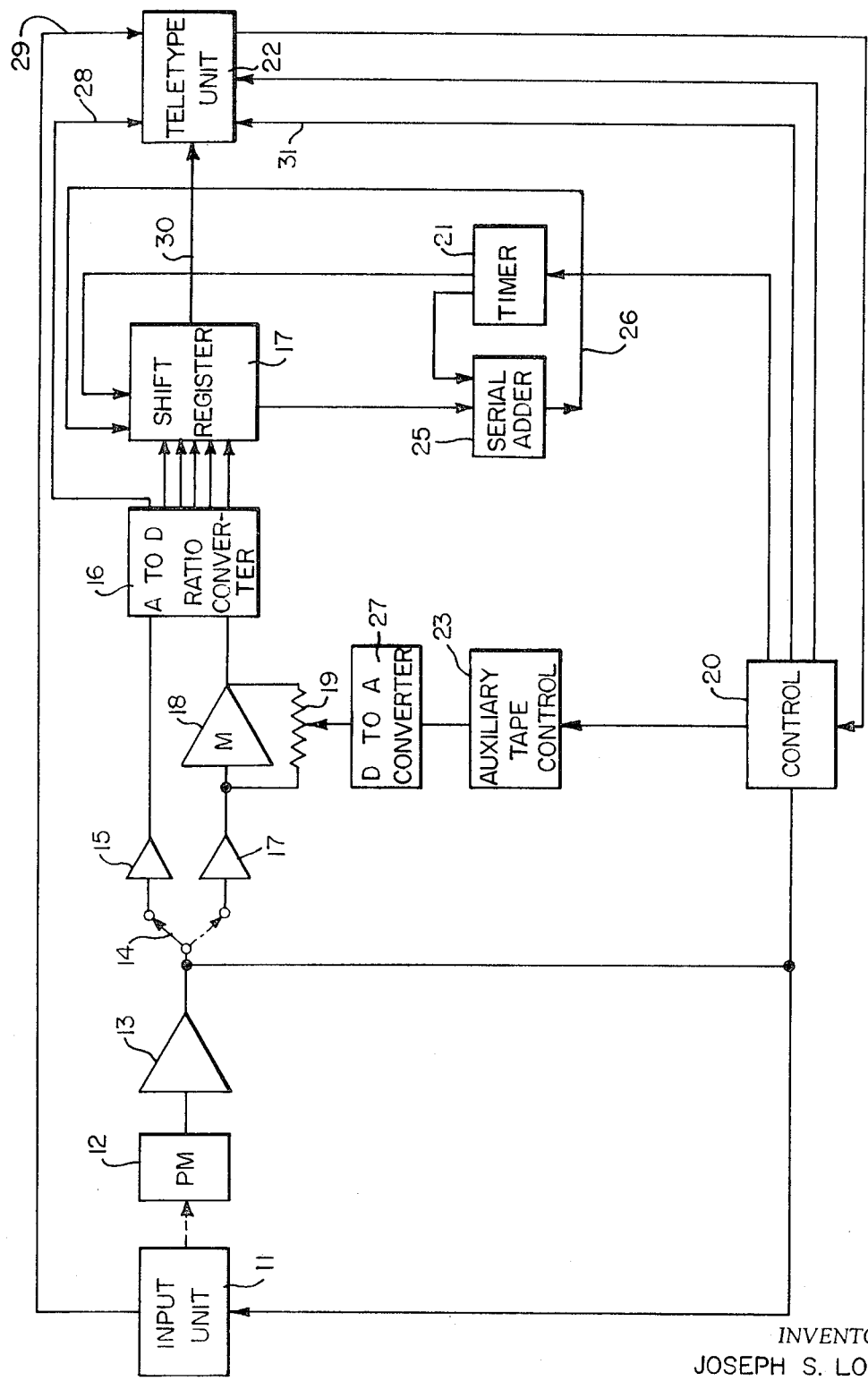

AUTOMATIC 100 LINE ADJUSTMENT OF SPECTROPHOTOMETERS

BACKGROUND OF THE INVENTION

This invention relates to a spectrophotometer and more specifically to a compensating spectrophotometer which reduces photometric errors due to detector imbalance and variable response with wavelength.

The intensity of radiation emitted from most radiation sources varies as a function of wavelength. Further, various optical elements, such as, for example, mirrors, lenses and prisms also transmit or reflect differing amounts of radiation depending on the wavelength of the radiation. The sensitivity of most radiation detectors such as spectrophotometers, also, have an output dependent upon the wavelength of the input light.

In many systems, particularly spectrophotometers, it has been desirable to provide a system in which the radiation detector produces a constant or substantially constant output signal as a function of input wavelength in the absence of absorption by a sample. By providing such a system the 100percent–line of a spectrophotometer can be maintained constant. However, it is virtually impossible to design the basic optical and electronic system so that a 100percent–line, without some kind of compensation, is flat to better than a few tenths of a percent. The major reason for this lack of flatness is well understood, representing differences in the transmissibility and reflectivity of optical elements over the useful range of light wavelengths passed through the system.

The standard practice in the art is to check the transmission of two air samples in a transmission instrument or to check the reflectivity of two balanced while reflectance plaques in a reflectance-type instrument. By definition of balance or equality in both cases, a straight line should be generated by the spectrophotometric output representing a balanced system for all wavelengths. Most quality instruments manufactured today use a dual beam system which cancels out gross errors in the optical paths and the characteristics of the optical elements. Those differences not cancelled are the main contributors to the deviation from a perfect 100percent–line.

In many instruments, the 100percent–line is laboriously adjusted by schemes employing potentiometers that are switched in as the monochromator prism or grating is rotated. Since these are basically analog devices, they are subject to drift and temperature coefficient problems that are usually equal to or worse than the effect they have in attempting to compensate for instrument error.

It, therefore, is an object of this invention to provide an apparatus and method for correcting a 100percent–spectral line in a spectrophotometer to a very high degree of accuracy.

It is another object of this invention to provide a digital means for economically correcting the output of a spectrophotometer over the range of wavelengths passed through the system.

STATEMENT OF THE INVENTION

Accordingly, this invention contemplates correcting radiation measuring errors in a spectrophotometer by digitizing the output of a 100percent–line input generated by matched standard references at selected discrete wavelengths. Each of the digitized values represent the spectrophotometer response at a particular wavelength. A factor, called an M factor, is calculated for the output at each discrete wavelength such that the digitized output multiplied by the M factor will give a 100percent–output at each wavelength. These factors are each stored, and then when a sample is measured by the spectrophotometer, each of the stored M factors are synchronously applied to multiply the input signal derived from the sample thereby generating an output that is corrected of spectrophotometer error.

DESCRIPTION OF THE DRAWING

Other objects, features and advantages of this invention will become more fully apparent from the detailed description, appended claims and following drawing which shows a block diagram of the automatic spectrophotometer correction system of this invention.

DETAILED DESCRIPTION

This invention utilizes digital techniques for correcting a 100percent–spectral line to a very high degree of accuracy in a spectrophotometer. A pair of matched standards are placed at the ports of the spectrophotometer. Depending on whether the spectrophotometer is a reflectance or transmission instrument, the reflectance or transmission of each standard is sequentially detected for each selected wavelength. The wavelength at which a measurement is being taken is selected by a discrete interference filter monochromator in the preferred embodiment but may be selected by any of a number of suitable means well known in the art. The detected transmitted or reflected radiation is sequentially amplified and fed to an analog-to-digital ratio converter which calculates the ratio of the reflectance of the first standard to that of the second standard. If the spectrometer is perfectly balanced, the output of the analog-to-digital ratio converter will be unity. However, such is not usually the case, especially, when ratios are being taken for a multiplicity of discrete wavelengths. Thus, the spectrophotometer must be compensated in some manner to achieve such a balance. As contemplated by this invention, this is achieved by calculating an M-factor so that the above ratio when multiplied by M will equal unity. The formula is given by:

$RM=1$ where R is the ratio calculated in the analog-to-digital ratio converter. Since the calculation is one of simple division, it can be achieved automatically in any computer. Techniques are well known for receiving binary coded digits such as in the above-defined ratio R and operating on it by division to generate a second binary coded digit such as the $M$-factor and thus, this operation will not be described in detail.

When measurements on a real sample are made on the spectrophotometer against a standard, the value of reflectance, or transmission is multiplied by the calculated $M$-factor either at the output of the analog-to-digital converter by computer means or by applying the $M$-value to a variable gain amplifier in the sample channel of the spectrophotometer. If the multiplication is performed by the variable gain amplifier, the digital output of the analog-to-digital ratio converter will be correct as read out.

In calculating $M$ according to the foregoing description, the use of a computer capable of storing data and capable of division is required. In the preferred embodiment, this is obviated by making an approximation as follows:

(1) $MR=1$ where $R$ is the ratio reading of a 100-percent line at a given wavelength, when two matched standard reference materials are tested (2) $R+d=1$ where $d$ is the difference between the actual reading of a 100-percent line and the ideal reading of a 100-percent line at the selected wavelength, thus (3) $M=1/R=1/(1-d)$ Multiplying both the numerator and denominator by $1+d$ results in (4) $M=(1+d)/(1-d^2)$ If the approximation is made that $d^2$ is much smaller than 1, then (5) $M=1+d$ Combining equation (5) with equation (2) results in (6) $M=2-R$ The result is thus achieved that the $M$-factor can be calculated simply by subtracting the output of the analog-to-digital ratio converter obtained when two matched standards are being tested from the numeral 2. Thus, the need for complex computer circuitry capable of division is eliminated.

Refer now to the figure which shows an input unit 11 which has a light source, and a monochromator which separates input light into discrete wavelengths. The monochromator may be of any suitable type with a provision for scanning the spectrum past an exit slit such that the transmittance or reflectance of the sample as a function of wavelength can be measured and recorded. Provision is made for the interposition of sample materials (not shown) in the sample beam path and standard reference materials in the reference beam path. The illumination output of the monochromator is fed to a photomultiplier cell or, in the alternative, a photocell 12 where it is detected. The output of the photocell 12 is amplified in amplifier 13 and fed to a synchronous switch 14. Switch 14 as shown schematically is mechanical but may be of any suitable type including a transistorized switching circuit. In the position as shown, the spectrophotometer is measuring the input from a standard reference material which input is fed to an integrating amplifier 15. The output of the integrating amplifier 15 is fed to an analog-to-digital ratio converter 16. Switch 14, when in the position indicated by the dotted line transmits the input derived from the sample material. This signal is fed to a sample signal integrator 17 and then to an $M$-amplifier 18 connected serially thereto. $M$-amplifier 18 has a variable gain which is adjusted by varying resistance 19. The output of $M$-amplifier 18 which in effect multiplies the sample signal by an $M$-factor is fed to the analog-to-digital ratio converter 16. The analog-to-digital ratio converter is well known in the art and simply performs the mathematical function of taking the ratio of the signal from the $M$-amplifier 18 to the reference signal from amplifier 15 and converts the ratio from an analog to a digital signal. The digital output from the analog-to-digital ratio converter 16 is then fed in parallel to a shift register 24 where it is temporarily stored.

The remaining calculating and control circuitry can best be described by way of example. Thus, suppose that two white plaques of the same reflectance are used to run a raw 100-percent line. The light from the first plaque is fed to photomultiplier 12 and is then converted to an electronic signal which is amplified in amplifier 13. The amplified signal passes through switch 14 to integrating amplifier 15 where the signal is integrated and is then fed to analog-to-digital ratio converter 16. Switch 14 is then closed onto the input of integrating sample amplifier 17. The second plaque reflects light into photomultiplier tube 12 which converts the signal, as before, to an electronic signal which is amplified in amplifier 13. This amplified signal is fed to and integrated in integrator amplifier 17 and is fed to $M$-amplifier 18. For purposes of calculation of the $M$-factor, the gain of amplifier 18 is set at unity. Thus, amplifier 18 has no gain. The output of amplifier 18 is fed to analog-to-digital ratio converter 16 where the ratio of the inputs from the two identical plaques is derived. This value should be unity if the spectrophotometer is balanced. However, as is often the case, the spectrophotometer will not be balanced and the output of converter 16 will be some number different than unity. This number is fed in binary coded form to both the shift register 24 and to teletype unit 22.

A central program and timing logic circuit is shown schematically by block diagram 20. This unit controls operational timing of peripheral devices such as the input unit 11 which includes a monochromator. It, also, controls a timer circuit 21 which, in turn, controls the computations performed to generate the $M$-factors, it controls a teletype unit 22 which both prints the output data and reads-in a program format for control 20, and it controls an auxiliary tape control unit which will be described hereinafter. After shift register 24 has received the output from converter 16 control unit 20 commands timer 21 to deliver a signal to the shift register commanding it to serially shift the complement of the binary number stored therein to serial adder 25 where the complement of the number in the shift register is added to the numeral 2.0000. The numeral 2.0000 is fed to the adder from timer 21. The output of the serial adder 25 is then fed back serially into shift register 24 along line 26. Since the complement of the number stored in the shift register, i.e., the ratio received from converter 16, is the negative of the number, the sum stored in the shift register 20 is in effect subtracted from 2.0000. Thus by this simple electronic calculation, the $M$-factor is calculated.

The shift register contents are then fed in parallel to teletype unit 22 where the information is recorded by a tape punch and stored. This cycle then repeats itself for each selected wavelength over a spectrum of wavelengths. When each of the desired $M$-factors have been calculated and recorded on a punch tape, the punch tape which contains the calculated $M$-values and their respective wavelength information is loaded into auxiliary tape control 23 which is a tape punch reader. A sequence of operation or format is then typed into teletype unit 22 which format, for example, may dictate at which wavelengths a sample material is to be tested. This information is converted to electronic binary coded signals and is fed to control unit 20 which in response thereto controls the filter position in the monochromator in input unit 11, synchronous switch 14, and auxiliary tape control 23, timer unit 21, and the teletype punch in teletype unit 22.

A sample material is now placed in one port of the input to the spectrophotometer and a standard reference material is placed in the other port.

A reading is to be taken at a first selected wavelength. Photomultiplier 12 receives the illuminance from the standard reference material and converts it into an electronic signal which is amplified by amplifier 13. This signal is then fed through synchronous switch 14 to amplifier 15 where it is again amplified. The output of amplifier 15 is then fed to converter 16. The illuminance from the sample material is then directed to photodetector 12 where it is converted into an electronic signal and is amplified by amplifier 13. The signal is then passed through synchronous switch 14 which is now situated in the dotted line position and is amplified in amplifier 16. At the same time, the previously calculated $M$-factor for this wavelength is fed from auxiliary tape control 23 to a digital-to-analog converter 27. The digital-to-analog converter converts the binary coded digital input to an analog output which controls feedback resistor 19 of $M$-amplifier 18 such that the gain of $M$-amplifier 18 is set equal to the $M$-correction factor. Techniques for setting a resistor in response to an electronic signal are well known and may be achieved in any of a number of ways known to those skilled in the art.

The signal derived from the sample material is then amplified in amplifier 18 which in effect multiplies the signal by the calculated $M$-factor. This signal is fed to analog-to-digital ratio converter 16 which generates a digital output ratio that is the ratio of the signal derived from the sample material multiplied by $M$ to the signal derived from the standard reference material. This signal is then fed directly to teletype input unit 22 for recording. During such a measurement of a sample material, the adding system comprising shift register 24, serial adder 25 and timer 21 does not function since control unit 20 does not give the required command signal to timer 21. This sequence is repeated until the sample is tested over the desired range of wavelengths.

Auxiliary tape control 23 in the preferred embodiment is a part of teletype unit 22. It is simply a punched tape reader which converts the information on a punched tape to a digital electronic number. Teletype unit 22 includes a tape punch and a reader. The reader converts information typed into the teletype machine to a binary coded electronic signal for delivery to control unit 20. The tape punch receives the corrected reflectance or transmission values of a sample from converter 16 by means of line 28. It also receives information as to monochromator filter position by means of line 29, $M$-factor calculations from shift register 24 along line 30 and control unit timing information along line 31. Commercial teletype units are well known in the art and may be of any suitable type having both an auxiliary tape punch reader, a tape reader and a tape punch.

The foregoing description was of a dual beam spectrophotometer. It is understood, however, that the error correction means of this invention can be used with any type of spectrophotometer, such as, for example, a single beam spectrophotometer. In such a unit a standard reference material is measured, the output of which is digitized into binary coded form. A correction factor is then calculated at each of a selected number of wavelengths by a computer capable of division by dividing the spectrophotometer output into a constant quantity. The constant may be the ideal theoretical response of the spectrometer, or it may be 100 or any other suitable constant. The correction factors are then stored either in the computer, or on magnetic tape, or punched tape or other suitable means. Next a sample material is measured. The signal derived from the sample is digitized at each of the selected wavelengths and is multiplied in the computer by the corresponding correction factor. The product is the corrected output of the spectrophotometer.

In the alternative the signal derived from the sample material may be multiplied by analog means before it is digitized. This can be accomplished by varying the gain of the spectrophotometer in accordance with the correction factor. Thus, for example, the stored correction factor may be converted to an analog signal which is utilized to vary the feedback resistance of an operational amplifier which amplifiers the signal derived from the sample. Such a technique of adjusting the gain of an amplifier has long been known and is relatively simple to use. The amplified signal is then fed to the output which produces the corrected signal for detecting.

While the preferred embodiment of the present invention has been described and illustrated in the drawing, it will be appreciated by those skilled in the art that various modifications may be made therein without departure of the scope of the invention as defined in the claims.

I claim:

1. A method of correcting error in a spectrophotometer comprising the steps of
    generating a first spectrophotometer output in response to illumination at discrete wavelengths from a standard reference source,
    calculating a correction factor at each of a selected plurality of wavelengths, said correction factors being the ratio of a constant to said first output,
    storing said correction factors,
    generating a second spectrophotometer output in response to illumination at discrete wavelengths from a test source, said test source including a sample to be tested, and
    multiplying said second output at each of said selected plurality of wavelengths by the corresponding calculated correction factor.

2. The method of claim 1 further comprising the steps of
    deriving first and second signals in response to illumination at discrete wavelengths from a pair of matched standard references,
    digitally determining the ratio of said first and second signals, said ratio being said first output,
    deriving third and fourth signals in response to illumination at discrete wavelengths from a sample and one of said pair of standard references, respectively, and
    digitally determining the ratio of said third to said fourth signals, said ratio being said second output.

3. The method of claim 2 wherein said calculating step comprises the step of
    subtracting said first output from 2.

4. The method of claim 3 wherein said subtracting step comprises the steps of
    digitally deriving the complement of said first output, and
    adding said derived complement to 2.

5. The method of claim 2 wherein said multiplying step comprises the step of
    electronically adjusting the amplification of said third signal by the corresponding correction factor at each of said wavelengths.

6. The method of claim 5 wherein said calculating step comprises the step of
    subtracting said first output from 2.

7. A spectrophotometer comprising
    means for generating a first output at each of a plurality of discrete wavelengths from a standard reference source,
    means for generating a second output at each of said plurality of discrete wavelengths from a test source, said test source including a sample,
    digital means for calculating the ratio of a constant to said first output at each of said plurality of wavelengths, said ratio being a correction factor,
    means for storing said correction factors, and
    means for multiplying said second output at each of said plurality of wavelengths by said corresponding correction factor.

8. The spectrophotometer of claim 7 wherein said means for generating a first output comprises
    means responsive to a pair of matched standard references for generating a first and second signal, and
    means for deriving a first ratio of said first signal to said second signal, said means for generating a second output comprises
    means responsive to a sample for generating a third signal,
    means responsive to one of said standard references for generating a fourth signal, and
    means for deriving a second ratio of said third signal to said fourth signal, said digital means for calculating a ratio comprises .
    means for calculating the ratio of unity to said first ratio, said calculated ratio being a correction factor, and said means for multiplying comprises
    means for multiplying said second ratio at each of said plurality of wavelengths by said corresponding correction factor.

9. The spectrophotometer of claim 8 wherein said means for calculating the ratio of unity to said first ratio comprises
    means for subtracting said first ratio from 2.

10. The spectrophotometer of claim 9 wherein said means for subtracting said first ratio from 2 comprises
    means for obtaining the digital complement of said first ratio, and
    means for adding said complement of said first ratio to 2.

11. The spectrophotometer of claim 9 wherein said means for multiplying comprises
    means for multiplying at each of said plurality of wavelengths said third signal derived from said sample by the corresponding correction factor at each corresponding wavelength.

12. The spectrophotometer of claim 11 wherein said means for multiplying said third signal comprises
    an amplifier for amplifying said third signal, and
    electronic means for adjusting the gain of said amplifier at each of said plurality of wavelengths to equal the correction factor at each corresponding wavelength.

* * * * *